C. B. POST.
THILL-COUPLING.
No. 192,187. Patented June 19, 1877.
Fig. 1
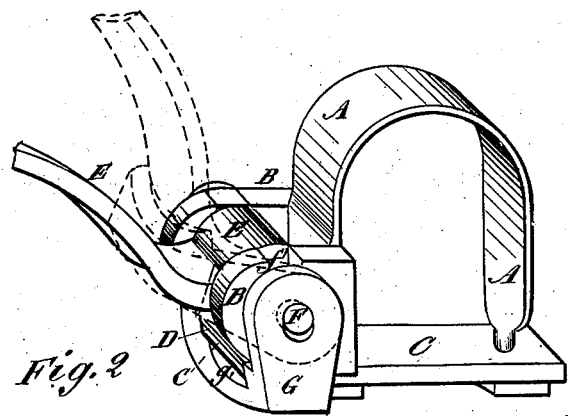
Fig. 2
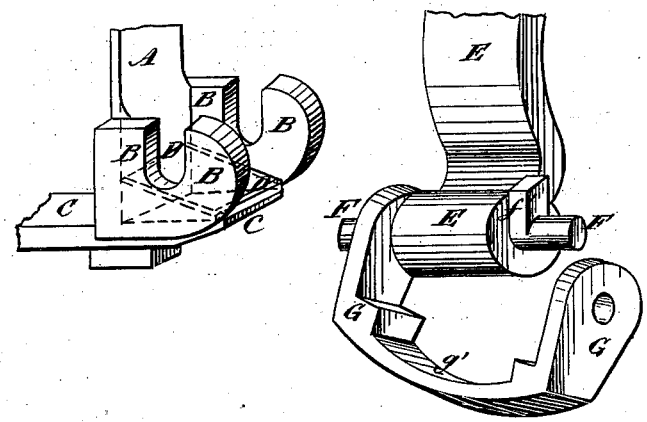
Fig. 3
WITNESSES:
C. Neveux
J. H. Scarborough
INVENTOR:
C. B. Post
BY
ATTORNEYS.

UNITED STATES PATENT OFFICE.

CHARLES B. POST, OF NEW LONDON, OHIO.

IMPROVEMENT IN THILL-COUPLINGS.

Specification forming part of Letters Patent No. 192,187, dated June 19, 1877; application filed February 10, 1877.

*To all whom it may concern:*

Be it known that I, CHARLES B. POST, of New London, in the county of Huron and State of Ohio, have invented a new and useful Improvement in Thill-Coupling, of which the following is a specification:

Figure 1 is a perspective view of my improved thill-coupling. Fig. 2 is a detail perspective view of the hooks and the forward part of the clip and yoke. Fig. 3 is a perspective view of the thill-iron, bolt, and fastener.

Similar letters of reference indicate corresponding parts.

The object of this invention is to furnish an improved coupling for securing thills and poles to carriages, which shall be so constructed that it cannot become unfastened when the thills or pole are in working position, which shall be so constructed as to enable the pole or thills to be easily and quickly attached and detached, and which shall be anti-rattling.

The invention consists in the combination of the bolt or pin provided with the stop, the U-shaped recessed fastener, and the rubber block, with the hooks formed upon the forward arm of the clip, and with the forwardly-projecting end of the yoke, as hereinafter fully described.

A represents the bow of the clip upon the side edges of the forward arm, of which are formed hooks B or lugs notched in their upper edges.

C is the yoke, which is secured to the bow A by nuts, in the usual way, and the forward end of which projects between the hooks B to form a seat for the rubber block D.

E is the thill-iron, the eye of which is made of such a width as to fit between the hooks B.

F is the bolt or pin that passes through the eye of the thill-iron E, and through the cavities or notches of the hooks B. The bolt or pin F has a lug, $f'$, formed upon it to fit into the notch of one of the hooks B, and which also serves as a stop to prevent the said bolt or pin from working out and from turning. The ends of the pin or bolt F project, so as to pass through the ends of the fastener G.

The fastener G is made U-shaped, so as to pass around the hooks B, and has a recess, $g'$, formed in it to receive the forward end of the yoke C. The forward ends of the hooks B are made eccentric, so that the fastener G, when turned down into the position shown in Fig. 1, may draw the eye of the thill-iron E down upon the rubber block D and lock the coupling. The rubber block D may be so formed as to press the eye of the thill-iron E upward or forward or upward and forward, as may be desired. The holes in the fastener G are beveled to enable the bolt or pin F to be inserted or removed.

To uncouple the coupling the fastener G is swung forward, the thills are raised above their natural position, and the thill-irons E, bolt or pin F, and fastener G, can then be raised from the hooks B. The fastener G and bolt or pin F can then be detached from the thill-iron E in the manner indicated in Fig. 3.

Having thus described my invention, I claim as new and desire to secure by Letters Patent—

The combination of the bolt or pin F, provided with the stop $f'$, the U-shaped recessed fastener G, and the rubber block D, with the hooks B formed upon the forward arm of the clip A, and with the forwardly-projecting end of the yoke C, substantially as herein shown and described.

CHARLES B. POST.

Witnesses:
H. G. SKINNER,
G. E. WASHBURN.